(12) United States Patent
Harkal et al.

(10) Patent No.: US 9,676,895 B2
(45) Date of Patent: Jun. 13, 2017

(54) WATER DISPERSIBLE EPOXY URETHANE COMPOUNDS AND COATING COMPOSITIONS

(75) Inventors: Umesh D. Harkal, Fargo, ND (US); Andrew J. Muehlberg, Fargo, ND (US); Peter A. Edwards, Cokato, MN (US); Dean C. Webster, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 309 days.

(21) Appl. No.: 12/840,019

(22) Filed: Jul. 20, 2010

(65) Prior Publication Data
US 2011/0263753 A1 Oct. 27, 2011

Related U.S. Application Data

(63) Continuation-in-part of application No. 11/882,754, filed on Aug. 3, 2007, now Pat. No. 7,776,956, and a
(Continued)

(51) Int. Cl.
*C09D 175/00* (2006.01)
*C08G 18/28* (2006.01)
(Continued)

(52) U.S. Cl.
CPC ..... *C08G 18/2845* (2013.01); *C08G 18/2805* (2013.01); *C08G 18/706* (2013.01);
(Continued)

(58) Field of Classification Search
CPC C09D 175/08; C09D 163/06; C08G 18/2805; C08G 18/2845
(Continued)

(56) References Cited

U.S. PATENT DOCUMENTS 3,484,413 A * 12/1969 Kaufman .......... 528/49
3,894,922 A * 7/1975 Bosso et al. .......... 204/499
(Continued)

FOREIGN PATENT DOCUMENTS

WO 99/03905 A1 1/1999
WO WO 02/31021 A1 4/2002
(Continued)

OTHER PUBLICATIONS

Bayhydur XP 7165: Water Dispersible Polyisocyanate, Product Information. Sep. 2002.
(Continued)

*Primary Examiner* — Michael L Leonard
(74) *Attorney, Agent, or Firm* — J.A. Lindeman & Co., PLLC

(57) ABSTRACT

The invention relates to novel aqueous coating compositions containing epoxy urethane (glycidyl carbamate) functional resin. An aqueous coating composition comprises a polyfunctional oligomer having at least two epoxy urethane functional groups and a polyalkylene oxide chain, an optional surfactant, and water. The aqueous coating compositions of the invention can be dispersed in water with or without added surfactants to form a dispersion containing no volatile organic solvent. The invention provides a method for making aqueous coating compositions containing epoxy urethane functional resin as well. Water-dispersible epoxy urethane compounds of the aqueous coating compositions are also provided.

19 Claims, 7 Drawing Sheets

Related U.S. Application Data continuation-in-part of application No. 12/680,401, filed as application No. PCT/US2008/078112 on Sep. 29, 2008.

(60) Provisional application No. 60/835,433, filed on Aug. 4, 2006, provisional application No. 61/321,713, filed on Apr. 7, 2010, provisional application No. 60/976,072, filed on Sep. 28, 2007.

(51) Int. Cl.
| | |
|---|---|
| C09D 163/06 | (2006.01) |
| C09D 175/08 | (2006.01) |
| C08G 18/70 | (2006.01) |
| C08G 59/50 | (2006.01) |
| C09D 163/00 | (2006.01) |

(52) U.S. Cl.
CPC ....... *C08G 59/5026* (2013.01); *C09D 163/00* (2013.01); *C09D 163/06* (2013.01); *C09D 175/08* (2013.01)

(58) Field of Classification Search
USPC ........................................ 524/591, 839, 840
See application file for complete search history.

(56) References Cited

U.S. PATENT DOCUMENTS

| | | | |
|---|---|---|---|
| 4,397,993 A | 8/1983 | Tefertiller et al. | |
| 4,950,722 A | 8/1990 | Parker | |
| 5,043,381 A | 8/1991 | Coogan et al. | |
| 5,481,027 A * | 1/1996 | Kirchner ............... | C07C 275/62 252/8.61 |
| 5,717,054 A * | 2/1998 | Schultz ................ | C07D 303/22 257/E21.505 |
| 6,100,326 A | 8/2000 | Richter et al. | |
| 6,172,159 B1 | 1/2001 | Gaal, Jr. et al. | |
| 6,849,337 B2 * | 2/2005 | Ohrbom ............. | C08G 18/2845 106/287.22 |
| 2002/0103319 A1 * | 8/2002 | Ohrbom et al. ............... | 526/312 |
| 2010/0285311 A1 * | 11/2010 | Steidl et al. ................... | 428/339 |
| 2010/0319580 A1 * | 12/2010 | Webster et al. ............ | 106/287.2 |

FOREIGN PATENT DOCUMENTS

| | | |
|---|---|---|
| WO | 03/060026 A1 | 7/2003 |
| WO | 2009/042999 A1 | 4/2009 |

OTHER PUBLICATIONS

Hsia Hung-Chung et al., "Glycidyl-Terminated Polyurethane Modified Epoxy Resins: Mechanical Properties, adhesion Properties and Morphology," Journal of. Applied. Polymer. Science., 52:1137-1151 (1994).
Peter A Edwards et al., "Novel Polyurethane Coating Technology Through Glycidyl Carbamate Chemistry," JCT Research, 2(7): 517-527 (2005).
Peter A. Edwards et al., "Synthesis and Self-Crosslinking of Glycidyl Carbamate Functional Oligomers," Polymer Preprints., 44(1):54 (2003).
Dieter Dieterich, "Die Angewandte Makromolekulare Chemie," pp. 133-165 (1981).
Byung Kyu Kim et al., "Waterborne Polyurethanes and Their Properties," Journal of Polymer Science: Part A: Polymer Chemistry, 34:1095-1104 (1996).
Michael Dvorchak et al., "A New Water Reducible Blocked Polyisocyanate (NWRBP) for One Component (IK) Polyurethane Coatings," Proceedings of the International Waterborne, High-Solids, and Powder Coatings Symposium, pp. 405-419 (2000).
John A. Escarsega et al., "Water-Reducible PUR Coatings for Military Applications," Modem Paint and Coatings, pp. 21-30 (1997).
Melissa A. Grunlan et al., "Waterborne Coatings with an Emphasis on Synthetic Aspects; An Overview," American Chemical Society Symposium Series, pp. 1-26 (1997).
Roy E. Hartz, "Reaction During Cure of a Blocked Isocyanate-Epoxy Resin Adhesive," Journal of Applied Polymer Science, 19:735-746 (1975).
Anthony Page et al., "Polyester Resins in Water-Based Urethanes," Paint & Ink International, 9(2):37-40 (1996).
Michael J. Dvorchak et al., "Water-Reducible Unsaturated Polyester Polymers as Binder for UV-Curable Furniture Coatings," Proceedings of the Waterborne, High-Solids, and Powder Coatings Symposium, pp. 253-267 (1989).
Zhiming W Ang et al., "Synthesis and Characterization of UV-Curable Waterborne Polyurethane-Acrylate Ionomers for Coatings," Journal of Applied Polymer Science, 73:2869-2876 (1999).
Jjan-wen Yang et al., "Chain-extended UV-Curable Waterborne Polyurethane-Acrylate," Gaofenzi Cailiao Kexue Yu Gongcheng, 19(2):199-202 (2003) (with English Abstract).
Jong Yoon Jang et al., "Effect of Process Variables on Molecular Weight and mechanical Properties of War-Based Polyurethane Dispersion," Colloids and Surfaces, A: Physicochemical and Engineering Aspects, 196:135-143 (2002).
G. Guenduez et al., "Structure-Property Study of Waterborne Polyurethane Coatings with Different Hydrophilic Contents and Polyols," Journal of Dispersion Science and Technology, 25(2):217-228 (2004).
Qu Jinqing et al., "Synthesis of High Solid Content Waterborne Polyurethane Dispersion," Huagong Xuebao, 54(6):868-871 (2003) (with English Abstract).
Xiao-hui Song et al, "Effect of PEG Molecular Weight in Hydrophilic Segment on the Crystallization of Cast Film of Waterborne Polyurethane," Xiamen Daxue Xuebao, Ziran Kexueban, 41(4):463-467 (2002).
D.D. Web, "Urethane Systems Reactivity Measurement," Journal of Cellular Plastics, pp. 208-212 (1985).
H.-W. Illger et al., "Reaction Kinetics Study of High Resilient Polyurethane Foams," Polyurethanes World Congress. pp. 305-310 (1987).
Chen et al., "Preparation and Characterization of Cryogenic Adhesives. I. Glycidyl-Terminated Polyurethane Resins," J. Applied Polymer Science 51:1199-1206 (1994).
Farissey et al., "The Rearrangement of Glycidyl N-Phenylcarbamate," Journal of Heterocyclic Chemistry 7:331-333 (1970).
Edwards, et al., "Synthesis and Characterization of Glycidyl Carbamate Functional Oligomers," Polymer Preprints 44 (1):144-145 (2003).
Edwards, et al., "Kinetics and Cure of Glycidyl Carbamate Functional Oligomers," Polymeric Materials: Science and Engineering 90:455-456 (2004).
Edwards, et al., "Cure Properties of Glycidyl Carbamate Functional Oligomers Reacted with Amines," Polymer Preprints 45(1):935-936 (2004).
Edwards, et al., "Synthesis, characterization and self-crosslinking of glycidyl carbamate functional resins," Prog. Org. Coat. 57:128-139 (2006).
International Search Report for PCT/US2008/078112 dated Dec. 24, 2008.
International Preliminary Report on Patentability of PCT/US2008/078112 dated Mar. 30, 2010.

* cited by examiner

SCHEMATIC REPRESENTATION OF THE SYNTHESIS OF WATER DISPERSIBLE GLYCIDYL CARBAMATE RESINS.

Figure 3: $^{13}$C NMR spectrum of resin R1.

SCHEMATIC REPRESENTATION OF THE DISPERSED PARTICLE OF
GLYCIDYL CARBAMATE RESIN IN WATER.

SCHEMATIC REPRESENTATION OF MAKING A WATERBORNE GLYCIDYL CARBAMATE COATING FORMULATION.

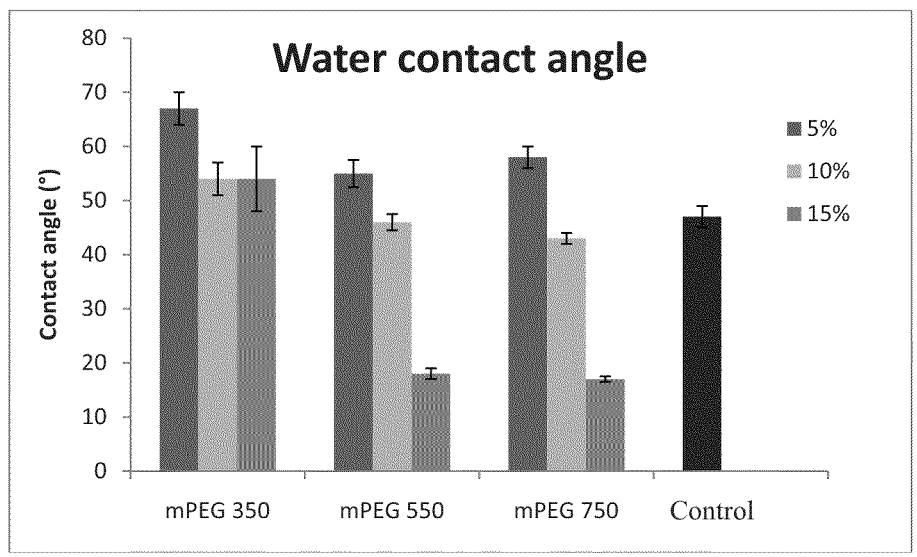
Figure 7: Water contact angle of the glycidyl carbamate coatings.

WATER DISPERSIBLE EPOXY URETHANE COMPOUNDS AND COATING COMPOSITIONS

CROSS REFERENCE TO RELATED APPLICATIONS

This application is a continuation-in-part of U.S. Nonprovisional application Ser. No. 11/882,754, filed 3 Aug. 2007, now U.S. Pat. No. 7,776,956, issued 17 Aug. 2010, which claims the benefit of U.S. Provisional Application Ser. No. 60/835,433, filed 4 Aug. 2006, both of which are incorporated herein by reference. This application also claims the benefit of U.S. Provisional Application Ser. No. 61/321,713, filed 7 Apr. 2010, which is incorporated herein by reference. This application is also a continuation-in-part of U.S. Nonprovisional application Ser. No. 12/680,401, filed 8 Sep. 2010, which is a National Stage application of International PCT application PCT/US2008/078112, filed 29 Sep. 2008, which claims the benefit of U.S. Provisional Application Ser. No. 60/976,072, filed 28 Sep. 2007, all of which are incorporated herein by reference.

GOVERNMENT RIGHTS

This invention was funded at least in part by funds from the U.S. Government (Grant Nos. NVY-1S-2025/617 NDSU, NVY-1S-2026/620 NDSU, FA9550-09-C-0150 (prime), and 861-NVY-2S/NDSU Prime:N00024-05-C-4139). The U.S. Government may, therefore, have certain rights in this invention.

FIELD OF THE INVENTION

The invention relates to novel aqueous coating compositions comprising a polyfunctional oligomer having at least two epoxy urethane functional groups and a hydroxylated polyalkylene oxide chain, an optional surfactant, and water. These compositions can be dispersed in water with or without added surfactants to form a dispersion containing no volatile organic solvents. The dispersed polymer can self-crosslink and can also crosslink with multifunctional amine compounds into a hard, glossy, solvent resistant coating.

BACKGROUND OF THE INVENTION

Thermosetting polymers systems are widely used in many applications including protective coatings, composite materials, and adhesives. Many of these systems involve the reaction of polymers or oligomers with other materials containing mutual reactive groups. For example, hydroxyl functional polymers are crosslinked with functional oligomers, or epoxy resins are crosslinked with polyfunctional amines.

The final properties of thermoset coatings are determined by the composition of the reactants used. Epoxy coatings generally exhibit good corrosion performance while polyurethane systems result in coatings having good toughness, abrasion resistance, and durability. Epoxy urethane (glycidyl carbamate) chemistry has the potential of combining epoxy and polyurethane technology into a single system and has been shown to improve toughness in epoxy-amine systems (Hsia H. C. et al., "*Glycidyl-Terminated Polyurethane Modified Epoxy Resins: Mechanical Properties, adhesion Properties and Morphology*", *J. Appl. Polym. Sci.*, 52, 1134 (1994) and Edwards, P. A. et al., "*Novel Polyurethane coating Technology Through Glycidyl Carbamate Chemistry*", JCT Research, 2, 517, (2005)).

Epoxy urethane (glycidyl carbamate) group is readily synthesized from the reaction of an isocyanate with glycidol:

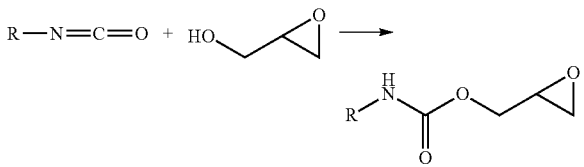

(Tefertiller, N. B. et al., U.S. Pat. No. 4,397,993; Edwards, P. E. et al., *Synthesis and Self-Crosslinking of Glycidyl Carbamate Functional Oligomers*, Polymer Preprints 2003, 44(1), 54.)

Epoxy urethane (glycidyl carbamate) functional polymers offer some unique opportunities in the formation of thermosetting polymers because the reactivity of an epoxy resin is combined with the physical properties obtained with polyurethanes. Epoxy urethane (glycidyl carbamate) functional oligomers can thermally self-crosslink and also crosslink with multifunctional amines. Kinetic experiments have shown that the glycidyl carbamate epoxy is more reactive than conventional glycidyl ether epoxides. Physical properties of the coatings are also excellent and have an excellent combination of both hardness and flexibility.

There is an increased interest in developing water-dispersible coating compositions to meet the environmental standards. The preparation of conventional polyurethane dispersions is well known in the art (Dietrich, D., *Die Ang. Makromol. Chem.*, 1981, 98, 133-165; Kim., B. K. et al., *J. Polym. Sci. Polym. Chem. Ed.*, 1996, Vol. 34, 1095-1104; Coogan, R. G. et al., U.S. Pat. No. 5,043,381). Waterborne polyurethane dispersions (PUD) require many process steps but yield good properties and are one of popular methods in reducing volatile organic compounds (VOCs). There are many resins used in water dispersion chemistry. For example, there are alkyd polyurethane dispersions (Dou, Z., et al., "Low VOC Polyol Alkyd Dispersion and Polyurethane Dispersions," PCT Int. Appl. WO/2002/031021), hydroxyl functional latexes (Dvorchak, M., et al., "*A new water reducible blocked polyisocyanate (NWRBP) for one component (1K) polyurethane coatings,*" Proceedings of the International Waterborne, High-Solids, and Powder Coatings Symposium (2000), 27th 405-419; Escarsega, J. A., et al., "*Water reducible PUR coatings for military applications,*" Modern Paint and Coatings (1997), 87(7), 21, 24-26; Grunlan, M. A., et al. "*Waterborne coatings with an emphasis on synthetic aspects; an overview.*" ACS Symposium Series (1997), 663 (Technology for Waterborne Coatings), 1-26; Hartz, R. E., "*Reaction during cure of a blocked isocyanate-epoxy resin adhesive,*" Journal of Applied Polymer Science (1975), 19(3), 735, water reducible polyesters (7 Gaal, R. J., et al., "*Water-reducible polyester resins and urethane coatings produced therefrom,*" U.S. (2001); Page, A., et al., "*Polyester resins in water-based urethanes,*" Paint Ink International (1996), 9(2), 37,40; Dvorchak, M. J., et al. "*Water-reducible unsaturated polyester polymers as binder for UV-curable furniture coatings,*" Proceedings of the Waterborne, High-Solids, and Powder Coatings Symposium (1991), 18th 253-67), and water reducible acrylics (Venditti Wang, et al. "*Synthesis and characterization of UV-Curable waterborne polyurethane-acrylate ionomers for coatings,*" Journal of Applied Polymer Science (1999), 73 (844), 2869-

2876); and Yang, Jian-wen et al., "Chain-extended UV-curable waterborne polyurethane-acrylate," Gaofenzi Cailiao Kexue Yu Gongcheng (2003), 19(2), 199-202.

One of the major problems with isocyanates when mixing in polyol is that most hydroxyl functional crosslinkers are hydrophobic. In some formulations, this has been overcome by mixing resin particles (Jang, Jong Yoon et al., "Effect of process variables on molecular weight and mechanical properties of water-based polyurethane dispersion," Colloids and Surfaces, A: Physicochemical and Engineering Aspects (2002), 196(2-3), 135-143; Guenduez, G. et al., "Structure-Property Study of Waterborne Polyurethane Coatings with Different Hydrophilic Contents and Polyols," Journal of Dispersion Science and Technology (2004), 25(2), 217-228) to protect the reaction from hydrolysis (Qu, Jinqing et al., "Syntheses of high solid content waterborne polyurethane dispersion," Huagong Xucbao (2003), 54(6), 868-871) or by isocyanate monomer selection (Song, Xiaohui et al., "Effect of PEG molecular weight in hydrophilic segment on the crystallization of cast film of waterborne polyurethane," Xiamen Daxue Xuebao, Ziran Kexueban (2002), 41(4), 463-467). Two component systems are usually formulated with the isocyanate in excess to alcohol, by using a ratio of isocyanates to alcohol of 2:1 (over-indexing). These systems require more isocyanate to be used due to competing reactions with water. One way to lessen isocyanate reactivity with water is to increase molecular weight by building the prepolymer (Jang, Jong Yoon et al., "Effect of process variables on molecular weight and mechanical properties of water-based polyurethane dispersion," Colloids and Surfaces, A: Physicochemical and Engineering Aspects," (2002), 196(2-3), 135-143; Webb, D. D. "Urethane systems reactivity measurement," Journal of Cellular Plastics (1985), 21(3), 208-12). The dominant isocyanate reaction is with an alcohol group (Illger, H. W., et al. "Reaction kinetics study of high resilient polyurethane foams," Polyurethanes World Congr. Proc. FSK/SPI (1987), 305-10. Publisher: Technomic, Lancaster, Pa.).

There is currently a great need for low or near zero VOC (volatile organic content) systems in developing waterborne resin technology. Therefore, it is advantageous to provide waterborne polyurethane dispersions that provide the performance currently required by the industries with excellent combination of higher reactivity and physical properties of epoxy and polyurethane technology. It would be also desirable that the coating compositions can be dispersed in water with or without added surfactants to form a dispersion containing no volatile organic solvent.

SUMMARY OF THE INVENTION

The invention relates to aqueous coating compositions comprising a polyfunctional oligomer having at least two epoxy urethane functional groups and a polyalkylene oxide chain, an optional surfactant, and water. The invention also provides methods for making an aqueous coating composition comprising a polyfunctional oligomer having at least two epoxy urethane functional groups and a polyalkylene oxide chain, an optional surfactant, and water. The aqueous coating compositions of the invention are completely solvent-free, i.e., do not utilize any co-solvents, such that the content of VOCs is zero while maintaining the dispersibility of the copolymer in water without any co-solvents.

A water-dispersible epoxy urethane resin of the Formula (I) or Formula (II) of the aqueous coating composition represents another embodiment of the invention.

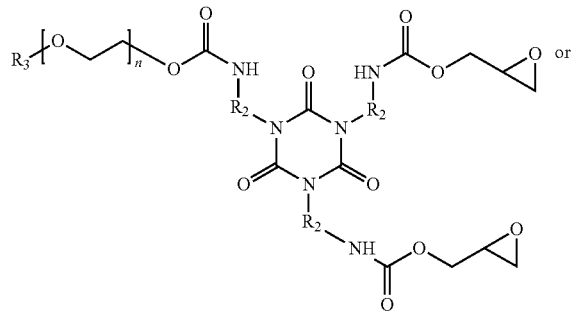

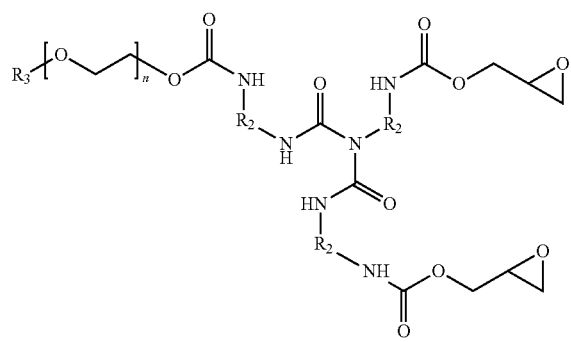

wherein
$R_2$ is independently an optionally substituted, divalent $C_1$-$C_{15}$ alkyl, optionally substituted divalent $C_3$-$C_{15}$ cycloalkyl, or a group selected from

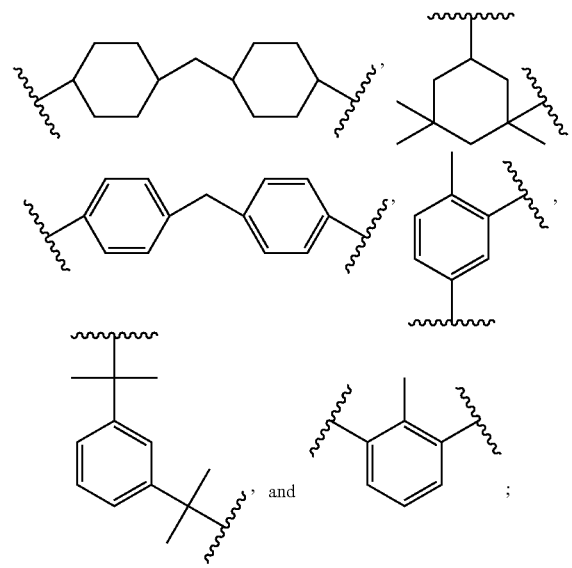

and $R_3$ is independently an optionally substituted $C_1$-$C_{15}$ alkyl or an optionally substituted divalent $C_3$-$C_{10}$ cycloalkyl.

BRIEF DESCRIPTION OF THE FIGURES

FIG. 7 shows a graph of the water contact angle of the glycidyl carbamate coatings.

DETAILED DESCRIPTION OF THE INVENTION

Figure 1:
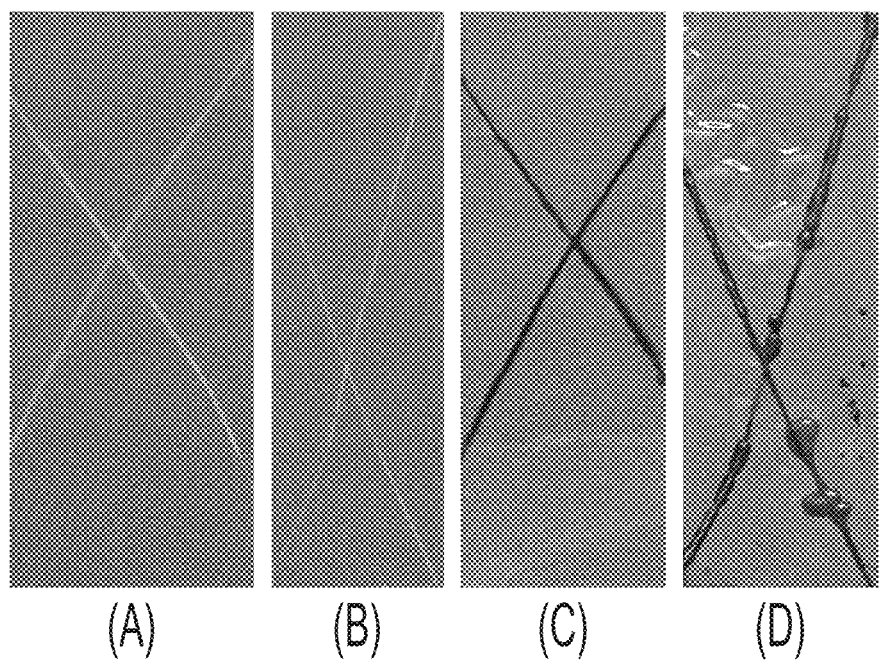
FIG. 1 depicts salt spray test panels formulated using an aqueous coating composition of the invention containing and epoxy urethane resin at ambient conditions and D.E.R. 332 reacted with PACM at 80° C. for one hour as a control.

The invention is directed to novel aqueous coating compositions comprising a polyfunctional oligomer having at least two epoxy urethane functional groups and a polyalkylene oxide chain, an optional surfactant, and water.

The polyfunctional oligomer is prepared from the reaction of hydrophilic modified polyfunctional isocyanates resin with glycidol. The polyfunctional resin is derived from controlled polymerization or oligomerization of difunctional isocyanates. Free isocyanate is reacted with glycidol to form an epoxy urethane functional resin. The polyfunctional resin also includes a polyfunctional biuret or isocyanurate.

Any suitable organic polyisocyanate, such as an aliphatic, cycloaliphatic, araliphatic or aromatic polyisocyanate, may be used either singly or in mixtures of two or more. The aliphatic isocyanates provide generally better light stability than the aromatic compounds. Aromatic polyisocyanates, on the other hand, are generally more economical and reactive toward polyols and other poly(active hydrogen) compounds than aliphatic polyisocyanates. Suitable aromatic polyisocyanates include but are not limited to those selected from the group consisting of 2,4-toluene diisocyanate, 2,6-toluene diisocyanate, a dimer of toluene diisocyanate (available under the Desmodur® trademark from Bayer Materials Science, Leverkusen, Germany), diphenylmethane 4,4'-diisocyanate (MDI), 1,5-diisocyanato-naphthalene, 1,4-phenylene diisocyanate, 1,3-phenylene diisocyanate, fluorinated and/or silicone containing derivatives of the aforementioned, and mixtures thereof. Examples of useful cycloaliphatic polyisocyanates include but are not limited to those selected from the group consisting of dicyclohexylmethane diisocyanate ($H_{12}$, MDI, commercially available under the Desmodur® trademark from Bayer Materials Science, Leverkusen, Germany), isophorone diisocyanate (IPDI), 1,4-cyclohexane diisocyanate (CHDI), 1,4-cyclohexanebis (methylene isocyanate) (BDI), 1,3-bis(isocyanatomethyl) cyclohexane ($H_6$ XDI), and mixtures thereof. Examples of useful aliphatic polyisocyanates include but are not limited to those selected from the group consisting of hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethyl diisocyanate, and mixtures thereof. Examples of useful araliphatic polyisocyanates include but are not limited to those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, or mixtures thereof.

Preferably, a polyfunctional resin is derived from the diisocyanates to yield resins having more than two isocyanate groups per molecule. This is commonly accomplished by making the isocyanurate or biuret adducts of the diisocyanates.

Preferably, the polyfunctional resin derived from isocyanurate or biuret is selected from the group consisting of TDI (toluene diisocyanate)isocyanurate, TDI biuret, MDI (diphenylmethane diisocyanate)isocyanurate, MDI biuret, HDI (hexamethylene diisocyanate)isocyanurate, HDI biuret, NDI (naphthalene diisocyanate)isocyanurate, NDI biuret, HMDI (hydrogenated MDI)isocyanurate, HMDI biuret, and IPDI (isophorone diisocyanate)isocyanurate and IPDI biuret. More preferably, a polyfunctional resin derived from isocyanurate or biuret consists of HDI (hexamethylene diisocyanate)isocyanurate or HDI biuret.

The polyfunctional oligomer of the invention is hydrophilic. Applicable hydrophilic functionality with suitable functional groups can readily be provided with the skilled person. Preferably, the polyfunctional oligomer has a polyalkylene oxide chain with 1 to 50 alkylene oxide units, preferably 2 to 20 alkylene oxide units. More preferably, the polyalkylene oxide chain may be an ethylene oxide chain, a propylene oxide chain, or an ethylene propylene oxide chain.

A hydrophilic polyfunctional isocyanate resin based on hexamethylene diisocyanate and having ethylene oxide units is commercially available and sold under the Bayhydur® XP 7165 tradename by Bayer Materials Science, Leverkusen, Germany. Hydrophilic isocyanates may also be synthesized by reacting a polyfunctional isocyanate resin, such as Desmodur® N 3600 (Bayer Materials Science, Leverkusen, Germany), with a hydroxyl terminated polyether such as mPEG.

The invention also provides a water-dispersible epoxy urethane resin of the Formula (I) or Formula (II) of the aqueous coating composition:

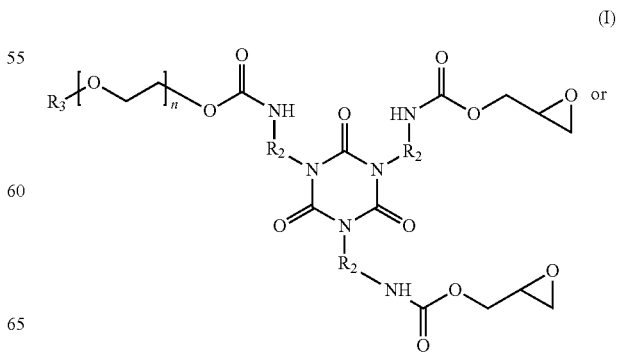

-continued

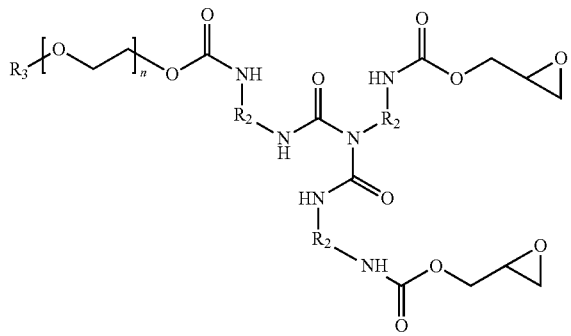

(II)

wherein n ranges from 1 to 50

$R_2$ is independently an optionally substituted, divalent $C_1$-$C_{15}$ alkyl, optionally substituted divalent $C_3$-$C_{15}$ cycloalkyl, or a group selected from

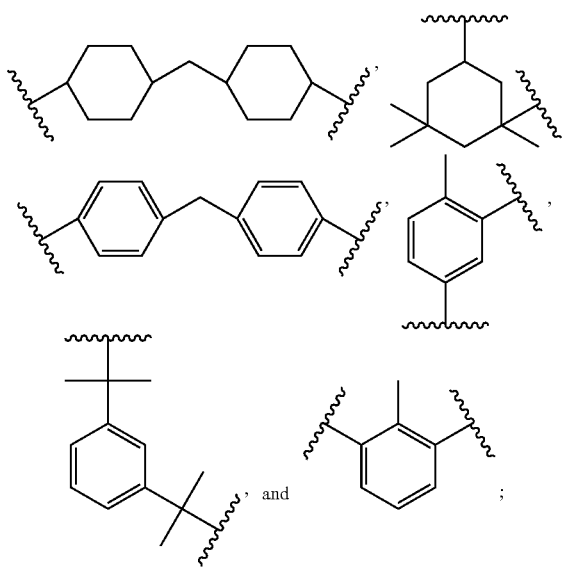

and $R_3$ is independently an optionally substituted $C_1$-$C_{15}$ alkyl or an optionally substituted divalent $C_3$-$C_{10}$ cycloalkyl. Preferably, $R_2$ is —$(CH^2)_6$—, and $R_3$ is a $C_1$-$C_{10}$ alkyl.

The term "alkyl" includes straight and branched alkyl groups. The term "cycloalkyl", as used herein, refers to groups having three to ten, preferably three to seven carbon atoms. Suitable cycloalkyls include, but are not limited to cyclopropyl, cyclobutyl, cyclopentyl, cyclohexyl, cycloheptyl, and the like. As indicated above, $R_2$ and $R_3$ may be substituted with any number of substituents or functional moieties. Examples of substituents include, but are not limited to, halo substituents, e.g. F; Cl; Br; or I; a hydroxyl group; a $C_1$-$C_6$ alkoxy group, e.g., —$OCH_3$, —$OCH_2CH_3$, or —$OCH(CH_3)_2$; a $C_1$-$C_6$ haloalkyl group, e.g., —$CF_3$; —$CH_2CF_3$; or —$CHCl_2$; $C_1$-$C_6$ alkylthio; amino; mono and dialkyl amino groups; —$NO_2$; —$CN$; a sulfate group, and the like.

Surfactants are commonly used in coating formulations to improve wetting of the substrate by the coating, and wetting of the pigment by the resin. They can also improve formulating latitude by preventing shocking of the coating composition as various components are added and can increase the service life of the coating by increasing shelf stability. Typically, low levels of surfactants are used to accomplish these goals and mixtures of surfactants may be employed to impart one or more of the properties listed above. Surfactants are not generally volatile materials under ambient conditions and remain in the coating during the drying process. However, at the low concentrations typically used, little effect on polymer hardness or coating performance is observed. If too much surfactant is used in the aqueous coating composition, the wet coating could exhibit excessive foaming and poor thickening efficiency with thickeners while the cured coating could have problems with water sensitivity, poor exterior durability and poor block, stain and print resistance. Thus, surfactants are typically used in the lowest amounts necessary to achieve their beneficial properties while avoiding any detrimental effects.

Any anionic or nonionic surfactant, as well as mixtures, may be used in a water-based polymer coating composition of the invention. The optional surfactant is present in an amount effective to stabilize a coating formed from the composition. In some formulations, a surfactant is not needed in order to obtain a stabile dispersion. Preferably the nonionic surfactant is a polyether nonionic surfactant, more preferably, an alkyl polyglycol ether, an alkyl phenol polyglycol ether, or a mixture thereof. Preferred alkyl phenol polyglycol ethers include ethoxylation products of octylphenol, nonylphenol, diisopropyl phenol, triisopropyl phenol, or mixtures thereof. Preferred alkyl polyglycol ethers include ethoxylation products of lauryl alcohol, oleyl alcohol, stearyl alcohol, or mixtures thereof. Preferred anionic surfactants include alkali metal or ammonium salts of alkyl, aryl or alkylaryl sulfonates, sulfates, phosphates. More preferably, the anionic surfactant is selected from sodium lauryl sulfate, sodium octylphenol glycolether sulfate, sodium dodecylbenzene sulfonate, sodium lauryldiglycol sulfate, ammonium tritertiarybutyl phenol and penta- and octaglycol sulfonates, sulfosuccinate salts such as disodium ethoxylated nonylphenol half ester of sulfosuccinic acid, disodium n-octyldecyl sulfosuccinate, sodium dioctyl sulfosuccinate, and mixtures thereof. AEROSOL 18 surfactant, a 35% solution of disodium N-octyldecyl sulfosuccinimate in water and AEROSOL OT-75 surfactant, a 75% solution of sodium dioctyl sulfosuccinate in water, both available from Cytec Industries, Inc. are preferred anionic surfactants. Triton GR-7M is also preferred sulfosuccinate surfactant.

In one embodiment, the aqueous coating composition of the invention is formulated using 10 to 90 parts, preferably 50 to 70 parts, of a polyfunctional oligomer; 90 to 10 parts, preferably 30 to 50 parts, water; and 0.1 to 10 parts, preferably 0.1 to 5 parts, of an optional surfactant, without addition of co-solvent. After mixing the polyfunctional oligomer and water, the surfactant may be added for dispersion and, if desired a diluted drop of defoamer, such as BYK 028 by BYK Chemie USA, may be used as a flow aid. The formulation may be mixed at room temperature.

A coating formed from an aqueous coating composition of the invention may be self-cured by heating to temperatures at or above 120° C. In a preferred embodiment, an aqueous coating composition of the invention contains a curing agent. As is known in the art, curing agents are sold separately from the coating composition. Accordingly, a curing agent may be added to an aqueous coating composition of the invention prior to coating. The amount of curing agent used is determined by the stoichiometric ratio of epoxy groups of the epoxy urethane (glycidyl carbamate) resin to active amine hydrogens on the amine curing agent. Stoichiometric ratios in the range of 0.5 to 2.0 can be used.

The curing agent serves to crosslink the resultant epoxy urethane coating formed using an aqueous coating composition of the invention. The curing agent may be any curing agent known in the art to cure (or crosslink) epoxy resins. The curing agent may be used in the manner and amount known in the art. The curing agents are generally water compatible (i.e., soluble, dilutable and/or dispersible). Suitable curing agents for use with the dispersions include those typically employed with epoxy resins, such as aliphatic, araliphatic and aromatic amines, polyamides, amidoamines and epoxy-amine adducts. The coating may be cured at ambient or elevated (e.g. about 80° C.) temperatures. Amine curing agents typically allow the coating to cure at ambient temperatures.

Suitable amine curing agents are those which are soluble or at least dispersible in an aqueous coating composition of the invention. Amine curing agents known in the art include, for example, diethylenetriamine, triethylenetetramine, tetraethylene-pentamine, etc. as well as 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononane; 1,12-diaminododecane; 4-azaheptamethylenediamine; N,N"-bis(3-aminopropyl)butane-1,4-diamine; 1-ethyl-1,3-propanediamine; 2,2(4),4-trimethyl-1,6-hexanediamin; bis(3-aminopropyl)piperazine; N-aminoethylpiperazine; N,N-bis(3-aminopropyl)ethylenediamine; 2,4(6)-toluenediamine; dicyandiamine; melamine formaldehyde; tetraethylenepentamine; 3-diethylaminopropylamine; 3,3"-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclohexane; 1,2-diamino-4-cyclohexylcyclohexane; isophorone-diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3- and 1,4-bis(aminomethyl) cyclohexane; and 1-cyclohexyl-3,4-dimino-cyclohexane. As exemplary araliphatic amines, in particular those amines are employed in which the amino groups are present on the aliphatic radical for example m- and p-xylylenediamine or their hydrogenation products as well as diamide diphenylmethane; diamide diphenylsulfonic acid (amine adduct); 4,4"-methylenedianiline; 2,4-bis(p-aminobenzyl)aniline; diethyltoluenediamine; and m-phenylene diamine. The amine curing agents may be used alone or as mixtures.

Suitable amine-epoxide adducts are, for example, reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above.

Preferably, amine curing agents used with the aqueous coating compositions of the invention are PACM (bis(para-aminocyclohexyl)methane), Anquamine 419, Anquamine 731, diethylene triamine (DETA), and 4,4'-methylene dianiline (MDA). Stoichiometry ratios of amine to oxirane of the aqueous coating compositions may be based on amine hydrogen equivalent weight (AHEW) and on weight per epoxide (WPE). A formulation of 1:1 was based on one epoxide reacted with one amine active hydrogen.

The invention also provides a method for making an aqueous coating composition comprising the steps of mixing a polyfunctional oligomer having at least two epoxy urethane functional groups and a hydroxylated polyalkylene oxide chain, an optional surfactant, and water. The method for making an aqueous coating composition may further comprise the step of adding a curing agent to the mixture of the polyfunctional oligomer, the surfactant, and water after the dispersion.

The aqueous coating compositions of the invention have an excellent combination of physical properties due to the carbamate and epoxide functionality. The coating composition has excellent cure and high pendulum hardness values as well as good solvent resistance. The aqueous coating composition with epoxy urethane functional resin of the invention shows the improvement in one or more of the following performance parameters, i.e., % nonvolatile solids, flexibility, scratch and mar resistance, and/or chip resistance, in a wide variety of coating compositions and applications, such as primers, basecoats, clearcoats, two-component systems, anti-chip coating compositions, water borne coatings, solvent borne coatings, coatings for flexible substrates, and the like. Furthermore, water-based coating composition with epoxy urethane functional resin of the invention provide etch resistant coating compositions which have an increased % NV (nonvolatile) or decreased VOC (volatile organic content) at a sprayable viscosity.

An aqueous coating composition of the invention would be applicable for use in a wide variety of coating compositions and applications, such as primers, basecoats, clearcoats, two-component systems, anti-chip coating compositions, water borne coatings, solvent borne coatings, coatings for flexible substrates, powder coatings, solventless powder-slurry coatings, solventless liquid coatings, and the like. Furthermore, the aqueous coating composition of the invention may be applied to any substrates, e.g., metal, wood, glass, stone, ceramic materials, concrete, rigid and flexible synthetic resins, textiles, leather, and paper. These substrates may first be treated with conventional primers before they are coated.

Any additional agent used in aqueous coatings, for example, fillers, stabilizers, wetting agents, dispersing agents, adhesion promoters, UV absorbers, HALS, etc. may be incorporated into the coating composition of the invention. While the agents are well-known in the prior art and may be used in the same manner, the amount used should avoid adversely affecting the aqueous coating composition or the resultant coating.

Upon formulation, an aqueous coating composition of the invention may then be applied to a variety of surfaces, substrates, or articles, e.g., paper, plastic, steel, aluminum, wood, gypsum board, or galvanized sheeting (either primed or unprimed). The aqueous coating composition may be applied to a substrate, article, or surface by any of a number of techniques well-known in the art. These include, for example, spray coating, dip coating, roll coating, curtain coating, and the like. For automotive body panels, spray coating is preferred. As discussed above, an aqueous coating employing a polymer of the invention may be thermally or ambiently cured. As a further aspect, the present invention relates to a shaped or formed article which has been coated with an aqueous coating composition of the invention.

A coating composition according to the invention may comprise a pigment (organic or inorganic) and/or other additives and fillers known in the art. Such additives or fillers include, but are not limited to, leveling, rheology, and flow control agents such as silicones, fluorocarbons, urethanes, or cellulosics; extenders; reactive coalescing aids such as those described in U.S. Pat. No. 5,349,026; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; curing agents; or coalescing agents. Specific examples of such additives can be found in Raw Materials Index, published by the National Paint & Coatings Association, 1500 Rhode Island Avenue, NW, Washington, D.C. 20005.

EXAMPLES

The following abbreviations and terms are used in the Examples below:
HDI: hexamethylene diisocyanate
PACM: para amino-cyclohexyl methane
Anquamine 419: curing agent
MEK: methyl ethyl ketone
mPEG: methoxy poly(ethylene glycol)
ASTM: American Society for Testing and Materials
Materials Used in Surfactant-Based Coatings
Glycidol was supplied by Dixie Chemical and stored refrigerated to minimize formation of impurities. An isocyanurate trimer of HDI (hexamethylene diisocyanate) with polyethylene oxide (Bayhydur XP 7165) was used as the polyfunctional isocyanate resin with an isocyanate equivalent weight of 230. K-KAT® XC-6212 was supplied by King Industries. Triton™ GR-7M anionic surfactant was provided by Union Carbide and BYK 028 defoamer was provided by BYK Chemie USA. Amines used as hardeners were purchased from Aldrich and provided by Air Products. These include; bis(para-aminocyclohexyl)methane (PACM) and Anquamine 419, respectively. D.E.R.® 332 (DGEBA) was supplied by The Dow Chemical Company.

Example 1: Synthesis of the Epoxy Urethane Resin

A 1000 ml four neck round bottom flask with condenser, nitrogen inlet and Model 210 J-KEM temperature controller, mechanical stirrer, with heating mantle were used for synthesis. The reaction vessel was charged with 225.21 grams glycidol and 700 grams of Bayhydur XP 7165 polyfunctional isocyanate resin and 0.112 grams K-KAT® XC-6212 (0.0025 weight percent). The temperature was held at 60° C. and the reaction was monitored and controlled within +/−two degrees Celsius. Infrared analysis was performed to determine reaction completion by monitoring the disappearance of the isocyanate peak at 2270 $cm^{-1}$. Epoxy equivalent weights were determined by titration with HBr (ASTM D1652). The theoretical epoxide equivalent weight of the product was 304, which compares with 303 grams/equivalent determined by titration.

Infrared (FTIR) measurements were performed using a Nicolet Magna-850 FTIR spectrometer. Sample aliquots were taken and coated directly on a potassium bromide salt plate. Omnic FTIR software for Nicolet was used to perform transmission with a final format of absorbance. Spectra acquisitions were based on 64 scans, resolution 4, and a data spacing of 1.98 $cm^{-1}$. The main compartment was used and set for auto gain to monitor a spectral range of 4000 $cm^{-1}$ to 400 $cm^{-1}$. Different intervals of the reaction were sampled to monitor disappearance of the isocyanate peak. GRAMS 32 v5 FTIR software was employed for spectral calculations.

Example 2: Aqueous Coating Compositions of the Invention

Aqueous coating compositions of the invention were formulated using the epoxy urethane resin of Example 1, an amine curing agent and water without addition of organic co-solvent. Coatings were formulated using 70% epoxy urethane resin and 30% water without addition of co-solvent. After mixing the resin and water, 1-drop Triton GR-7M surfactant was added for dispersion and diluting 1/6 of a drop of BYK 028 was used as a flow aid. Formulations were mixed with a glass stir rod, by hand, at room temperature. After the resin was dispersed in water, the amine curing agent, PACM or Anquamine 419, was added. Table 1 illustrates the formulation with actual amounts used. Coatings of from the aqueous coating compositions of the invention were prepared and tested as described below.

TABLE 1

Aqueous Coating Composition Formulation

| Formulation | Water (g) | Resin (g) | PACM (g) | Anquamine 419 (g) | Solids (%) |
|---|---|---|---|---|---|
| 1 | 3.752 | 8.474 | 1.450 | — | 69.3 |
| 2 | 4.50 | 3.752 | — | 9.710 | 69.7 |

Film Preparation:
The aqueous coating formulations were applied onto iron phosphated 22 gauge steel test panels purchased from Q-panel. Coating application was made using a drawdown bar for a final dry film thickness of approximately 64 microns for the PACM addition and approximately 71 microns for the Anquamine 419 addition. The coated panels were then air cured or placed in an oven at 80° C. for 60 minutes for crosslinking.

Hardness Measurements:
Hardness of films was evaluated 24 hours after the films cured in an 80° C. oven for 60 minutes and also for the air cured coatings. The films were tested for König pendulum hardness (ASTM D4366, with the values reported in seconds (sec)).

Reverse Impact Testing:
ASTM D2794 was used as a standard test method for the resistance of organic coatings to the effects of rapid deformation via reverse impact. Coatings were tested one week after cure using a Gardener impact tester (ASTM D 2794). The maximum drop height was 43 inches with a drop weight of 4 pounds. All measurements were performed in triplicate. Crazing or loss of adhesion was noted and inch pounds were determined at film finish failure. Samples that did not fail were noted >172 in-lbs.

MEK Double Rubs:
Methyl ethyl ketone (MEK) double rubs were used to assess the development of cure. The coating was applied to the steel test panel using a casting bar. For the ambient cure system, coated panels were placed in a dust free chamber to cure at room temperature. Panels were removed to determine cure by solvent resistance at the end of 2, 3, and 3.45 hours when PACM was used as the hardener. For the coating formulations Anquamine 419 was less reactive than PACM, measured by solvent resistance were place in the dust free chamber for 24 hours then analyzed for solvent resistance.

A 26-ounce hammer with 5-layers of cheesecloth wrapped around the hammerhead was soaked in MEK. After 100 double rubs the hammer was rewet with MEK. The number of double rubs to reach the substrate of the coating was reported. A fully cured coating was based on 400 double rubs without penetrating the coating to the substrate. The number of double rubs to reach the substrate coating was reported.

Gloss Measurements:

A Gardco® NovoGloss™ GL-NG1001S statistical gloss meter was used to determine gloss. Gloss measurements were performed using three different geometries 20°, 60°, and 85°. Geometry was optimized for a specific gloss range. In order to control the performance and linearity of the gloss meter a checking standard was used. The standard tile is a traceable institute standard. In order to obtain gloss differences three measurement geometries were taken.

Properties of epoxy urethane resin:PACM: Coatings:

Table 2 shows the physical property results for the resins crosslinked using the two different amines at 80° C. for 1 hour. The coatings had excellent cure and high pendulum hardness values. PACM yields slightly lower impact resistance and is a generally harder coating. A key difference is the equivalent weight and structure of the amine used.

TABLE 2

Cure development of oven cured coatings, 80° C. for 1-hour.

| Epoxy urethane resin: | Dry film thickness (microns) | König Pendulum Hardness (Seconds) | Impact (Inch-pounds) | MEK Double Rubs (Substrate) |
|---|---|---|---|---|
| 1 PACM | 64 | 147 | 168 | >1000 |
| 2 Anquamine 419 | 71 | 94 | >172 | >1000 |

Gloss readings of the 80° C. 1 hour oven cured coatings are shown in Table 3. The different gloss readings of these two samples are more clearly shown in the 20° readings, followed by the 60° readings. Gloss readings were higher for the epoxy urethane resin:PACM than for the epoxy urethane resin: Anquamine 419 for all three geometries used.

TABLE 3

Gloss of oven cured coatings, 80° C. for 1-hour.

| Gloss (degrees) | 2 Anquamine 419 | 1 PACM |
|---|---|---|
| 20 | 22.14 | 45.60 |
| 60 | 63.03 | 69.71 |
| 85 | 80.49 | 81.05 |

Example 3: Cure Development Under Ambient Conditions

Coatings were formulated as in Example 2, and cure development under ambient conditions was evaluated and the results are listed in Tables 4 and 5. Cure develops very rapidly, especially for the PACM-cured coating where full cure is achieved in less than four hours. Both coatings also had good hardness and flexibility after reaching complete cure.

TABLE 4

Cure development of Aqueous Coating Composition 1: PACM Air-cured Coating.

| Epoxy urethane resin | Dry film thickness (microns) | Hours to Cure before Testing | MEK Double Rubs (substrate) | König Pendulum Hardness (seconds) | Impact (Inch-pounds) |
|---|---|---|---|---|---|
| 1 PACM | 68 | 2 | — | 159 | — |
| — | — | 3 | 143 | 160 | — |
| — | — | 3.45 | >1000 | 143 | 164 |

TABLE 5

Cure Development of Aqueous Coating Composition 1: Anquamine 419 Air-cured Coating.

| Epoxy urethane resin | Dry film thickness (microns) | Hours to Cure before Testing | MEK Double Rubs (substrate) | König Pendulum Hardness (seconds) | Impact (Inch-pounds) |
|---|---|---|---|---|---|
| 2. Anquamine | 68 | 2 | 111 | — | — |
| — | — | 3 | 113 | — | — |
| — | — | 24 | >1000 | 106 | >172 |

The epoxy urethane resin:PACM had a slightly lower impact resistance than the epoxy urethane resin:Anquamine 419 and was generally a harder coating, possibly due to the equivalent weight and structure (cycloaliphatic amine) of the amine used. For ambient curing, the epoxy urethane resin:PACM fully cured within 3.5 hours and the epoxy urethane resin:Anquamine 419 cured over night. Both systems fully cured at 80° C. after a 1-hour cure. The epoxy urethane resin:PACM demonstrated a higher gloss than the epoxy urethane resin: Anquamine 419 for 20°, 60°, and 85° geometries.

Example 4: Salt Spray (ASTM B117) Testing of the Epoxy Urethane Resin with Compared to D.E.R. 332

For salt spray testing, an aqueous coating composition was prepared as in Example 2 and a control coating was prepared using D.E.R. 332 cured with PACM. Formulations were prepared using stoichiometric amounts of resin and hardener. Coatings were drawn down with a casting bar for a dry film thickness of approximately 75 microns. Coatings were cured at 80° C. for one hour. Once cured the panels were scribed to obtain a cross cut. Corrosion performance was performed according to ASTM B117. This is a continuous salt fog at 35° C. The electrolyte solution is 49.97 grams sodium chloride per 1 liter de-ionized water. The results are shown in FIG. 1. Corrosion of the test panels can be observed after being subjected to 450 hours in the salt spray chamber. The D.E.R. 332:PACM test panel had the most corrosion at the scribe (C) and the epoxy urethane resin:PACM began to delaminate (D). The control coating (D.E.R. 332:PACM) outperformed the epoxy urethane resin:PACM.

Materials Used in Surfactant-Free Waterborne Glycidyl Carbamate Coatings

Glycidol was supplied by Dixie Chemical and stored refrigerated to minimize formation of impurities. The two polyisocyanates used were hexamethylene diisocyanate isocyanurate (Desmodur® N 3600) and hydrophilic isocyanate (Bayhydur® XP 7165) provided by Bayer MaterialScience;

these have NCO equivalent weights (g/eq) of 180 and 230, respectively. Methoxy poly(ethylene glycol) (mPEG) of number average molecular weights 350, 550, and 750 were obtained from Aldrich. K-KAT® XC-6212, a zirconium chelate complex, was supplied by King Industries and used to catalyze the isocyanate and hydroxyl reactions to form the glycidyl carbamate (GC) resins. All of these reagents were used as received without any further purification. Amine crosslinker, Anquamine® 731 provided by Air products, has a hydrogen equivalent weight (gm/H) of 200. The Anquamine® 731 is a water-based curing agent reportedly designed to emulsify and crosslink epoxy resin without the use of any surfactants. Surfactant, Triton® GR-7M (anionic surfactant based on dioctyl sulfosuccinates) obtained from Dow chemical, was used in selected coating formulations.

Example 5: Synthesis of Surfactant-Free, mPEG-Modified Glycidyl Carbamate Resins A 500 ml four neck reaction vessel with condenser, nitrogen inlet and Model 210 J-KEM temperature controller, mechanical stirrer, and water bath used for heating and cooling the flask were used for synthesis. The synthesis was done in two steps.

Figure 2:
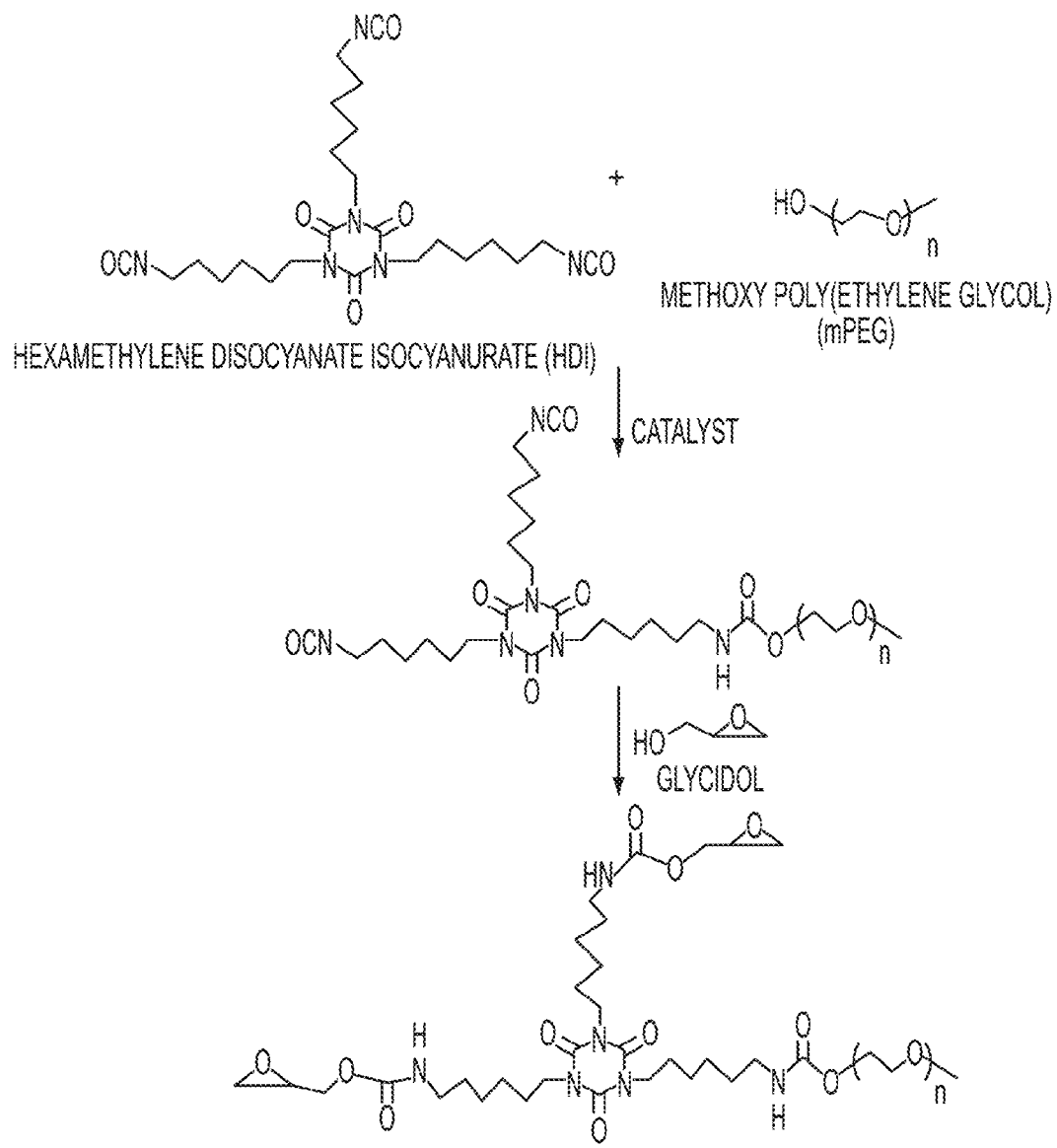
FIG. 2 is a schematic representation of the reaction for the synthesis of methoxy poly(ethylene glycol) (mPEG) modified glycidyl carbamate resins.

In the first step, the hydroxyl group of mPEG was reacted with a portion of isocyanate groups of the HDI polyisocyanate. The molecular weight and mole % of mPEG reacted with isocyanate groups varied from 350, 550, and 750 and 5%, 10%, and 15%, respectively. FIG. 2 is a schematic representation of the reaction for the synthesis of mPEG modified GC resins.

In the second step, the hydroxyl group of glycidol was reacted with the remaining isocyanate groups of the HDI isocyanate. Table 6 shows the GC resins synthesized.

A control GC resin was synthesized by reacting glycidol with commercial hydrophilic isocyanate (Bayhydur® XP 7165) containing a polyether chain (the exact molecular weight and mol % of polyether chain are a trade secret of Bayer MaterialScience).

TABLE 6

GC resins synthesized

| Resin | mPEG Molecular weight ($M_n$) | Mol % of mPEG | EEW (gm/eq) |
|---|---|---|---|
| R1 | 350 | 5% | 416 |
| R2 | 550 | 5% | 369 |
| R3 | 750 | 5% | 391 |
| R4 | 350 | 10% | 324 |
| R5 | 550 | 10% | 373 |
| R6 | 750 | 10% | 304 |
| R7 | 350 | 15% | 485 |
| R8 | 550 | 15% | 417 |
| R9 | 750 | 15% | 500 |
| R10 (Control) | Made from commercial hydrophilic isocyanate (Bayhydur® XP 7165) | | 358 |

EEW = epoxy equivalent weight (gm/eq)

The overall stoichiometric equivalent amount of isocyanate, mPEG, and glycidol based on —NCO and —OH groups used for the synthesis of GC resins was maintained at 1:1. The catalyst K-KAT® XC-6212, in the form of solution in tertiary butyl acetate (1-2% by wt.), was used for the reaction of isocyanates and hydroxyl groups.

During the synthesis of the modified GC resins, the reaction vessel was charged with Desmodur® N 3600 followed by addition of the required amount of mPEG. The reaction mixture was stirred at 50-60° C. for about 45-60 min. to ensure a homogeneous mixture. The catalyst (K-KAT® XC-6212) amount added after the mixing time was 0.03% by wt. (of the total reaction mass). The reaction was continued for 4-5 hrs at about 60-70° C. before the addition of glycidol. Proper temperature control was required for the exothermic reaction of glycidol with isocyanate functional compounds to avoid gelling of the resin during the synthesis. The amount of glycidol added was divided over 3-4 increments added over 4-5 hrs. Glycidol addition in the first increment was done at 45° C. The subsequent addition of glycidol was done at the temperature about 55-60° C. and this temperature was maintained until the isocyanate peak (at 2271 cm$^{-1}$) was gone in FTIR.

A GC resin was also synthesized by reacting Bayhydur® XP 7165 with glycidol. The reaction of Bayhydur® XP 7165 with glycidol was done using K-KAT® XC-6212 as a catalyst.

An unmodified GC resin was synthesized by reacting Desmodur® N 3600 with glycidol using catalyst K-KAT® XC-6212.

FTIR measurements were performed using a Nicolet Magna-850 FTIR spectrometer. Sample aliquots were taken and coated directly on a potassium bromide salt plate. Spectra acquisitions were based on 64 scans and a data spacing of 1.98 cm$^{-1}$. The main compartment was used and set for auto gain to monitor a spectral range of 4000 cm$^{-1}$ to 500 cm$^{-1}$. The change in band absorption of isocyanate (2272 cm$^{-1}$), —OH and —NH (3750-3000 cm$^{-1}$), amide (1244 cm$^{-1}$), and epoxide (910 cm$^{-1}$) bands were used to follow the reaction progress.

Figure 3:
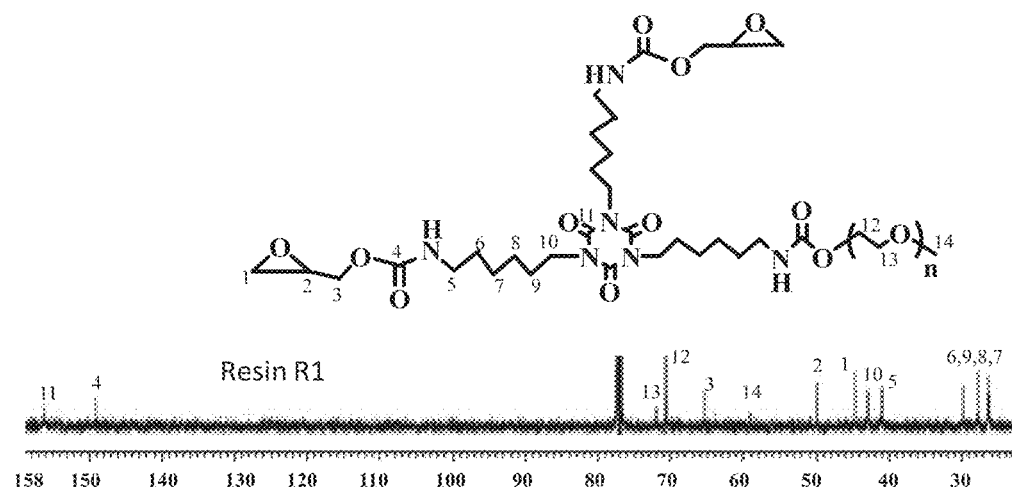
FIG. 3 depicts a $^{13}$C NMR spectrum of resin R1.

Characterization of the structures of the synthesized GC resins was done using $^{13}$C NMR. $^{13}$C NMR was carried out using a JEOL-ECA (400 MHz) NMR spectrometer coupled with an auto-sampler accessory. The spectra were run at 24° C. with 1000 scans. All the spectra were collected by dissolving 50 to 70 mg samples in 0.7 ml CDCl$_3$. The spectra were analyzed using Delta NMR processing and control software (Version 4.3.5). FIG. 3 shows the NMR spectrum of resin R1. The peaks at 45 and 50 ppm for epoxy group and at 59, 70, and 72 ppm for mPEG molecule indicated that the epoxy group and mPEG chain were incorporated in the structure of the GC resins.

Epoxy equivalent weight of the resins was determined by titration with hydrogen bromide (HBr) according to ASTM D1652. A required amount of resin (0.8-1.0 gm) was dissolved in 5-10 ml of chloroform and was titrated against a standardized HBr solution prepared in glacial acetic acid. The indicator used was a solution of crystal violet in glacial acetic acid. End point of the titration was the appearance of permanent yellow-green color.

Figure 4:
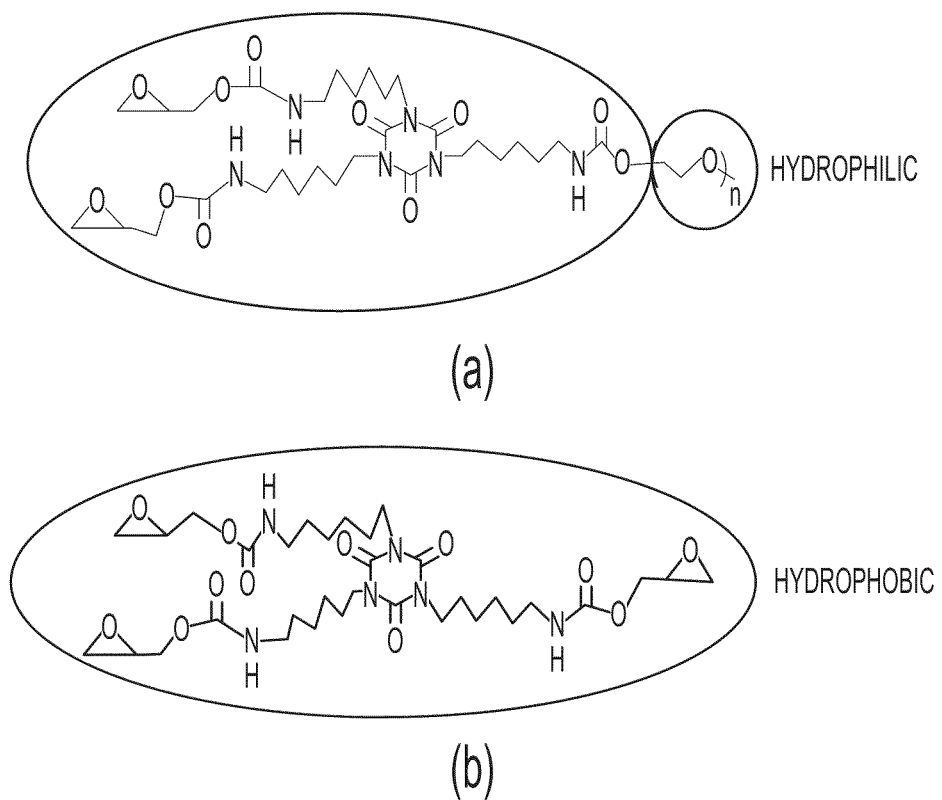
FIG. 4 depicts the composition of mPEG modified glycidyl carbamate resins (a) Hydrophilic glycidyl carbamate molecule and (b) Hydrophobic glycidyl carbamate molecule.

The composition of mPEG modified GC resins is illustrated in FIG. 4. Since only a fraction of the initial isocyanate groups are reacted with mPEG, the synthesized resins consist of a mixture of hydrophilic molecules containing mPEG (FIG. 4a) and hydrophobic molecules containing no mPEG (FIG. 4b). While the polyisocyanurate is illustrated as being a trifunctional molecule, the commercial material contains a substantial amount of higher molecular weight adducts.

Dispersion Stability:

High speed dispersion (HSD) was used to prepare resin dispersions in water (30% wt. solids) using a homogenizer (10,000 rpm for 10 min.). The required amount of resin and water were mixed in a plastic cup by hand before using the homogenizer. No surfactants/additives were used to prepare the dispersions. The dispersions were kept at ambient conditions and their dispersion stability was evaluated after one, six, and fourteen days. Dispersions of relatively low hydrophilic resins showed phase separation (settlement) while dispersions of highly hydrophilic resins were stable and showed no phase separation.

Dispersion stability was determined by visual examination to determine if phase separation (settlement) occurred in the test samples. Particle size analysis was performed on the dispersions that did not show any phase separation. The results of dispersion stability study are shown in Table 7. Dispersion stability was found to be strongly dependent upon mPEG chain length and its mol % in the GC resins. Resin R1, being the most hydrophobic resin as it contains the smallest mPEG chain length ($M_n$ of 350) in the smallest mol % (5 mol %) could not be dispersed in water using HSD and remained phase separated all the time. Control GC resin, R10, showed similar behavior to that of R1. Resin R10 did not go in water by HSD and remained phase separated. Resin R2 containing mPEG of molecular weight of 550 at 5 mol % showed better dispersibility compared to that of R1. Dispersion made with R2 showed formation of agglomerates at the bottom of container. However, the agglomerates could be redispersed with hand mixing resulting in a good dispersion. Resin R4 showed some phase separation after six days but formed a good dispersion following hand mixing. On the fourteenth day, R4 had resulted in a viscous non-flowable dispersion that upon further dilution with water a flowable dispersion was obtained containing no agglomerates. Resin R7 dispersion was similar to that of R4 dispersion, except R7 formed large agglomerates after diluting with water. Dispersion of resin R5 did not phase separate on the sixth day. The dispersion of resin R5 was found to be slightly phase separated on the fourteenth day but was redispersed well by hand mixing. Dispersions of the resins R3, R6, R8, and R9 showed no phase separation after fourteen days. Particle size analysis of these dispersions did not indicate the formation of large agglomerates over fourteen days. Resins R3, R6, and R9 contained mPEG of 750 molecular weight in 5, 10, and 15 mol %. Resin R8 contained mPEG of molecular weight 550 in 15 mol %. Thus, chain length as well as mol % modification influenced the dispersion stability.

TABLE 7

Dispersion stability of GC resins after high speed dispersion

| | One day | | Six days | | Fourteen days | |
|---|---|---|---|---|---|---|
| Resin | Dispersion stability | Particle size (nm) | Dispersion stability | Particle size (nm) | Dispersion stability | Particle size (nm) |
| R1 | C | — | C | — | C | — |
| R2 | B | — | B | — | B | — |
| R3 | A | 25 | A | 11 | A | 23 |
| R4 | B | — | B | — | D | — |
| R5 | A | 24 | A | 31 | B | — |
| R6 | A | 15 | A | 11 | A | 4 |
| R7 | B | — | B | — | E | — |
| R8 | A | 15 | A | 9 | A | 13 |
| R9 | A | 4 | A | 9 | A | 3 |
| R10 | C | — | C | — | C | — |

A = no phase separation,
B = partial phase separation redispersable by hand,
C = did not disperse in water by HSD and remained phase separated,
D = non-flowable viscous dispersion became flowable after addition of water and hand mixing, no agglomeration,
E = non-flowable viscous dispersion, showed large agglomerates after addition of water and hand mixing,
— = particle size experiments not performed because dispersions showed phase separation.

Figure 5:
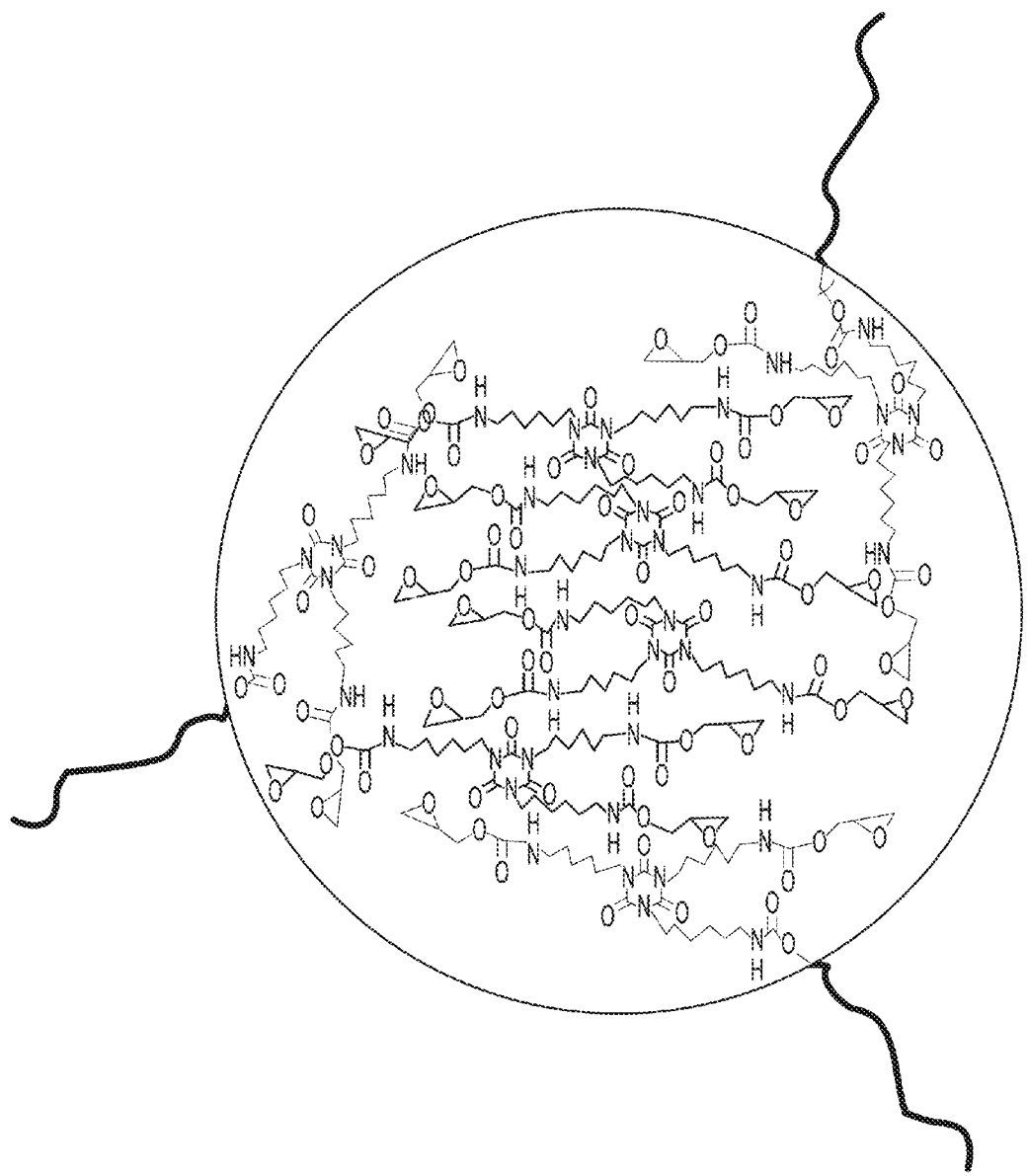
FIG. 5 is a schematic representation of the dispersed particle of glycidyl carbamate resin in water.

FIG. 5 is a schematic representation of the dispersed particle of GC resin in water. FIG. 5 shows that the particle consists of hydrophobic GC molecules (containing no mPEG) at the core surrounded by hydrophilic GC molecules with mPEG chains extending out in aqueous medium. It was determined that for any amount or chain length of the mPEG used for modifying the GC resin, less than about 33 mol % of the GC resin molecules contain an mPEG group. The remaining GC resin molecules do not contain an mPEG group. FIG. 5 illustrates this. GC resins contain strong hydrogen bonding groups such as urethane (—NHCO—) and carbonyl (—CO) responsible for their high viscosity. The high viscosity resulting from hydrogen bonding indicates the strong interaction among GC molecules which make them less favorable to interact with water molecules. Modification of GC resin by non-ionic hydrophilic mPEG chain might have disrupted the hydrogen bonding interaction among GC molecules and made them hydrophilic.

Example 6: Waterborne Glycidyl Carbamate Coating Formulations of the Invention

Figure 6:
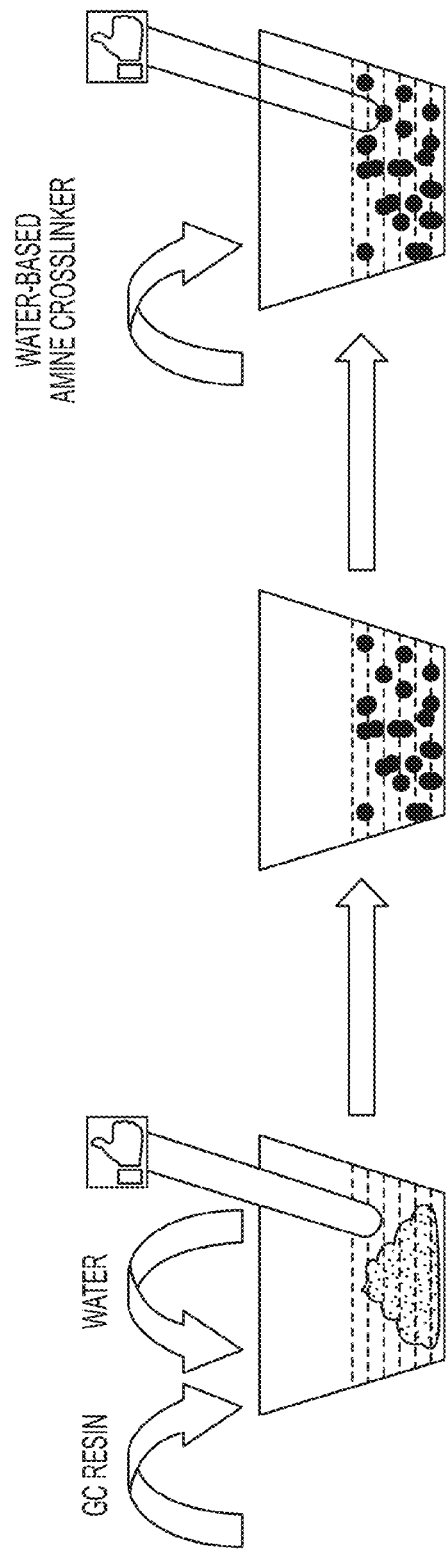
FIG. 6 is a schematic representation of making a waterborne glycidyl carbamate coating formulation.

Waterborne coating formulations of GC resins were made by mixing the components in water by hand. Specifically, the required amount of resin was dispersed in water (deionized water) in plastic cups using a tongue depressor. To the dispersed GC resins in water, the required amount of amine crosslinker was added by hand. FIG. 6 is a schematic representation of the process employed in making the waterborne GC coating formulations. The resulting formulations were kept at ambient for about 5 min. to stabilize the formulations. After the stabilization time, the coating formulations containing crosslinker were mixed by hand using a tongue depressor for about 5 min. and kept at ambient for about 10-20 min. (induction time) before taking drawdowns. The films were drawndown at 8 mils wet thickness on steel panels (smooth finished Q panels, type QD36, 0.5×76×152 mm) cleaned with p-xylene. The coatings were cured at ambient conditions for about two weeks before determining their water resistance, solvent resistance, and other coating properties. Dry film thickness of the coatings was between 65-70 μm.

Table 8 shows the coating formulations of the GC resins. GC resins (except R1 and R10) were dispersed in water without using any surfactant. Surfactant was used to disperse resins R1 and R10, because these resins could not be dispersed in water by hand.

TABLE 8

Coating formulations of the GC resins

| Formulations | Resins | Resin (wt. %) | Water (wt. %) | Surfactant (wt. %) | Crosslinker (E:A) |
|---|---|---|---|---|---|
| F1 | R1 | 62 | 37.3 | 0.7 | 1:1 |
| F2 | R2 | 66 | 34 | 0 | 1:1 |
| F3 | R3 | 63 | 37 | 0 | 1:1 |
| F4 | R4 | 66 | 34 | 0 | 1:1 |
| F5 | R5 | 67 | 33 | 0 | 1:1 |
| F6 | R6 | 67 | 33 | 0 | 1:1 |
| F7 | R7 | 67 | 33 | 0 | 1:1 |
| F8 | R8 | 66 | 34 | 0 | 1:1 |
| F9 | R9 | 66 | 34 | 0 | 1:1 |
| F10 (Control) | R10 (Control) | 63 | 36.3 | 0.7 | 1:1 |

Coating Performance

Water and Solvent Resistance:

Water resistance of the waterborne GC coatings was determined by water drop test and water double rubs measurement. The water drop test was carried out by placing a drop of water (approximate weight ~0.05 gm) on the coating surface. The water drop was covered with a glass slide (of size 2 cm×2 cm) to avoid evaporation of water. The glass slide was removed from the coating surface after 1 hr. The surface of the coating was examined for defects, bubble formation, film delamination, and any permanent marks. Six replicates of each coating formulation were tested. The number of coatings that did not show any surface defects, bubble formation, delamination, and permanent marks was reported. Thus, a water resistance test result reported as "6" indicates that all six replicates passed the test (i.e., no surface defects, bubble formation, delamination, or permanent marks) and the water resistance was the best.

Methyl ethyl ketone (MEK) double rubs test was used according to ASTM D 5402 to assess the solvent resistance and development of cure. A 26-ounce hammer with three layers of cheesecloth wrapped around the hammerhead was soaked in MEK. The hammer head was rewet with MEK after 30-50 double rubs. Once the metal panel surface was visible due to removal coating layer during the test, the number of double rubs was noted. The water double rub test was carried out in similar way as that of MEK double rub test by replacing MEK with deionized water. For the water double rub test, the number of double rubs was noted once the bubble formation, film delamination, permanent mark, or appearance of metal surface due to removal of coating was observed.

Water resistance of GC coatings was found to depend on the molecular weight and mol % of mPEG used in the resin synthesis. Table 9 shows the water and solvent resistance of the coatings. Coatings made from the formulations F1, F2, and F4 exhibited excellent water resistance. The formulations F1, F2, and F4 were made from the resins R1, R2, and R4, respectively. Resins R1 and R2 contained 5 mol mPEG having molecular weight of 350 and 550, respectively. Resin R4 contained 10 mol % mPEG having molecular weight of 350. Water resistance of the coatings made from control GC resin, R10 (formulation F10) was inferior to that of the coatings made from the resins R1, R2, and R4 (formulations F1, F2 and F4). Addition of a small amount of surfactant (0.7% by wt.) in coating formulation F1 to disperse GC resin R1, made with low extent of hydrophilic portion (mPEG molecular weight of 350 at 5 mol %), did not appear to affect the water resistance of its coating.

TABLE 9

Water and solvent resistance of the coatings.

| Formulations | Water drop test (6 = Best) | Water double rubs | MEK double rubs |
|---|---|---|---|
| F1 | 6 | >400 | >400 |
| F2 | 6 | >400 | >400 |
| F3 | 3 | >400 | >400 |
| F4 | 5 | >400 | >400 |
| F5 | 2 | >400 | >400 |
| F6 | 0 | >400 | >400 |
| F7 | 2 | >400 | >400 |
| F8 | 0 | 325 | >400 |
| F9 | 0 | 245 | >400 |
| F10 (Control) | 4 | >400 | >400 |

Coatings became more hydrophilic with an increase in mPEG molecular weight and mol % which resulted in decrease of their water resistance. Coatings made from the formulations F8 and F9 showed poor water resistance compared to that of the other coatings. The formulations F8 and F9 were made from the resins R8 and R9 and contained the large extent of hydrophilic part, 15 mol % mPEG having molecular weight of 550 and 750, respectively.

Solvent resistance of the coatings evaluated through MEK double rubs is widely accepted as an indication of development of cure or crosslinking in coatings. A high number of MEK double rubs is considered as an indication of high crosslink density. The extent of crosslinking plays an important role in determining the physical and chemical properties of coatings. See, e.g., Harkal, U D, Muehlberg, A J, Li, J, Garrett, J T, Webster, D C, J. Coat. Tech. Res., Manuscript submitted (2009). All of the GC coatings made exhibited excellent solvent resistance through MEK double rubs values reaching above 400 and indicated a development of high crosslink density. The extent of modification of GC resins by mPEG did not affect the solvent resistance of GC coatings.

The results of the water resistance tests suggested that the incorporation of mPEG molecular weight of 350 or 550 with 5 mol % or incorporation of mPEG molecular weight of 350 with 10 mol % in GC resins could produce coatings with good water resistance. Another interesting finding was that the addition of a small amount of surfactant to disperse relatively lower hydrophilic GC resin (R1) during coating formulation did not affect water resistance of GC coatings. Excellent solvent resistance of the coatings indicated that the crosslinking density was developed sufficiently to resist the penetration of solvent (MEK) molecules though the coatings. Thus, tailoring the extent of non-ionic hydrophilic groups in GC resins produced coatings with a good combination of water and solvent resistance.

Water Contact Angle Testing:

To determine relative hydrophilicity/hydrophobicity of the coating surface, water contact angle was measured using a First Ten Ångstrom FTA 100 series instrument. Results of the contact angle measurements correlated well the results of water resistance of the coatings. FIG. 7 shows the effect of chain length and mol % of mPEG on water contact angle value of the GC coating.

Increase in molecular weight and mol % of mPEG in GC resins decreased the water contact angle indicating the increase in hydrophilicity of the coatings. Water resistance of the coatings shown in Table 9 followed a similar trend. Increase in hydrophilicity of the coatings resulted in decrease of water resistance of the coatings. Water resistance evaluated through water drop test and water double rubs of the coatings made from resins R8 and R9 (formulations F8 and F9, respectively) was lower compared with that of the other coatings. Coatings made from resins R8 and R9 showed relatively lower water contact angle (18° and 17°, respectively) compared with that of the coatings made from the other resins. Resins R8 and R9 contained a large amount of the hydrophilic portion, 550 and 750 molecular weight mPEG at 15 mol %.

The results of water resistance and contact angle experiments suggested that chain length as well as mol % of mPEG in GC resins influenced the relative hydrophilicity of the coatings.

Appearance:

Waterborne GC coatings according to the invention were transparent, had high gloss, and did not show any signs of phase separation or haziness. The transparent coating film with no phase separation indicated good coalescence and reaction among dispersed GC resin particles and amine crosslinker.

Hardness, Reverse Impact Testing, Flexibility, and Cross Hatch Adhesion:

König pendulum hardness of the coatings was measured following ASTM D 4366. The hardness test results are reported in seconds (sec).

Reverse impact strength of the coatings was determined following ASTM D 2794 using a Gardener impact tester. The maximum drop height was 43 inches and the drop weight was 4 pounds. Crazing or loss of adhesion was noted and inch-pounds (in-lbs) were reported at film finish failure. Samples that did not fail were noted as having an impact strength of >172 in-lbs.

The conical mandrel test was also used according to ASTM D 522 for the determination of flexibility of the coatings. The results of the flexibility test were reported as the length of a crack (cm) formed on the coating during the test.

Cross hatch adhesion of the coatings was evaluated using a Gardco cross hatch adhesion instrument following ASTM D 3359.

Waterborne GC coatings according to the invention showed excellent flexibility, good adhesion, and hardness. Table 10 shows the performance of the GC coatings. All of the GC coatings showed no cracks in conical mandrel bend test indicating excellent flexibility. Reverse impact test showed excellent resistance of the coatings to rapid deformation. The impact resistance value of most of the coatings reached the maximum (172 in-lbs) of the instrument.

TABLE 10

Performance of waterborne GC coatings

| Formulations | Conical Mandrel (0 cm = Best) | Reverse Impact (in-lbs) | König pendulum hardness (sec) | Cross-hatch adhesion (5B = Best) |
|---|---|---|---|---|
| F1 | 0 | >172 | 44 | 5B |
| F2 | 0 | 128 | 97 | 4B |
| F3 | 0 | 112 | 90 | 0B |
| F4 | 0 | >172 | 60 | 1B |
| F5 | 0 | >172 | 59 | 1B |
| F6 | 0 | >172 | 30 | 4B |
| F7 | 0 | >172 | 23 | 5B |
| F8 | 0 | >172 | 19 | 5B |
| F9 | 0 | >172 | 24 | 5B |
| F10 (Control) | 0 | >172 | 39 | 5B |

The claimed invention is:

1. An aqueous coating composition comprising a dispersion of:
    (a) a polyfunctional oligomer having at least two epoxy urethane functional groups and a $C_1$-$C_{15}$ alkyl terminated polyalkylene oxide chain; and
    (b) water;
    wherein said aqueous coating composition does not contain a surfactant,
    wherein the polyfunctional oligomer comprises a polyfunctional resin derived from an isocyanurate or a biuret compound.

2. An aqueous coating composition comprising a dispersion of:
    (a) 10 to 90 parts of a polyfunctional oligomer having at least two epoxy urethane functional groups and a $C_1$-$C_{15}$ alkyl terminated polyalkylene oxide chain; and
    (b) 90 to 10 parts water;
    wherein said aqueous coating composition does not contain a surfactant,
    wherein the polyfunctional oligomer comprises a polyfunctional resin derived from an isocyanurate or a biuret compound.

3. An aqueous coating composition of claim 1 or claim 2, further comprising a curing agent.

4. An aqueous coating composition of claim 3, wherein the polyfunctional resin is selected from the group consisting of toluene diisocyanate isocyanurate, toluene diisocyanate biuret, diphenylmethane diisocyanate isocyanurate, diphenylmethane diisocyanate biuret, hexamethylene diisocyanate isocyanurate, hexamethylene diisocyanate biuret, naphthalene diisocyanate isocyanurate, naphthalene diisocyanate biuret, hydrogenated diphenylmethane diisocyanate isocyanurate, hydrogenated diphenylmethane diisocyanate biuret, isophorone diisocyanate isocyanurate and isophorone diisocyanate biuret; and
    the $C_1$-$C_{15}$ alkyl terminated polyalkylene oxide is a $C_1$-$C_{10}$ alkyl terminated polyalkylene oxide and the polyalkylene oxide chain is selected from the group consisting of an ethylene oxide chain, a propylene oxide chain, and an ethylene propylene oxide chain.

5. An aqueous coating composition of claim 3, wherein the polyfunctional resin is hexamethylene diisocyanate isocyanurate or hexamethylene diisocyanate biuret.

6. An aqueous coating composition of claim 3, wherein the curing agent is an amine curing agent.

7. An aqueous coating composition of claim 6, wherein the amine curing agent is selected from the group consisting of bis(para-aminocyclohexyl)methane, diethylene triamine, and 4,4'-methylene dianiline.

8. A method for making a polyfunctional oligomer having at least two epoxy urethane functional groups and a $C_1$-$C_{15}$ alkyl terminated polyalkylene oxide chain comprising the steps of reacting
    (a) methoxy poly(ethylene glycol) with a polyfunctional isocyanate resin derived from an isocyanurate or a biuret compound; and
    (b) glycidol with said polyfunctional isocyanate resin.

9. A method for making an aqueous coating composition comprising the step of mixing a polyfunctional oligomer having at least two epoxy urethane functional groups and a $C_1$-$C_{15}$ alkyl terminated polyalkylene oxide chain and water to form a dispersion,
    wherein a surfactant is not added to said aqueous coating composition wherein the polyfunctional oligomer comprises a polyfunctional resin derived from an isocyanurate or a biuret compound.

10. A method for making an aqueous coating composition of claim 9 comprising the step of mixing
    (a) 10 to 90 parts of a polyfunctional oligomer having at least two epoxy urethane functional groups and a $C_1$-$C_{15}$ alkyl terminated polyalkylene oxide chain; and
    (b) 90 to 10 parts water.

11. A method for making an aqueous coating composition of claim 9 or 10, further comprising the step of adding a curing agent to the mixture of the polyfunctional oligomer and water after the dispersion.

12. A method for making an aqueous coating composition of claim 9 or 10, further comprising, before the mixing step, the step of:
    reacting a $C_1$-$C_{15}$ alkyl terminated polyalkylene oxide modified polyfunctional resin having at least two isocyanates with glycidol to prepare the polyfunctional oligomer.

13. A method for making an aqueous coating composition of claim 9, wherein the polyfunctional resin is selected from the group consisting of toluene diisocyanate isocyanurate, toluene diisocyanate biuret, diphenylmethane diisocyanate isocyanurate, diphenylmethane diisocyanate biuret, hexamethylene diisocyanate isocyanurate, hexamethylene diisocyanate biuret, naphthalene diisocyanate isocyanurate, naphthalene diisocyanate biuret, hydrogenated diphenylmethane diisocyanate isocyanurate, hydrogenated diphenylmethane diisocyanate biuret, isophorone diisocyanate isocyanurate and isophorone diisocyanate biuret; and the $C_1$-$C_{15}$ alkyl terminated polyalkylene oxide is a $C_1$-$C_{10}$ alkyl terminated polyalkylene oxide and the polyalkylene oxide chain is selected from the group consisting of an ethylene oxide chain, a propylene oxide chain, and an ethylene propylene oxide chain.

14. The method for making an aqueous coating composition of claim 13, wherein the polyfunctional resin is hexamethylene diisocyanate isocyanurate or hexamethylene diisocyanate biuret.

15. The method for making an aqueous coating composition of claim 11, wherein the curing agent is amine curing agent.

16. The method for making an aqueous coating composition of claim 15, wherein the amine curing agent is selected from the group consisting of bis(para-aminocyclohexyl)methane, diethylene triamine, and 4,4'-methylene dianiline.

17. A substrate, article, or surface coated with an aqueous coating composition of claim 1.

18. An aqueous coating composition of claim 4, wherein the $C_1$-$C_{10}$ alkyl terminated polyalkylene oxide is methoxy polyalkylene oxide.

19. A method for making an aqueous coating composition of claim 13, wherein the $C_1$-$C_{10}$ alkyl terminated polyalkylene oxide is methoxy polyalkylene oxide.

* * * * *